June 29, 1954  D. B. COX ET AL  2,682,596
METAL FOIL HEATING DEVICE
Filed Jan. 30, 1951

INVENTORS
Duncan B. Cox
BY John L. Cox

Duell & Kane
ATTORNEYS

UNITED STATES PATENT OFFICE 2,682,596

METAL FOIL HEATING DEVICE

Duncan B. Cox and John L. Cox, Woodbury, N. Y.

Application January 30, 1951, Serial No. 208,528

6 Claims. (Cl. 201—69)

This invention relates to an improved heating device and to an improved blank for a heating device. Our invention has particular relation to a metallic foil heating element and it is an object of the invention to provide a metallic foil element which is adaptable and flexible so that it may be readily adapted to meet different installation and service requirements.

A further object is the provision of an improved electric heating device in the form of a metallic foil electric current path having means for distributing the current flow over a relatively wide area at the points of reversal of direction of current flow so as to prevent local overheating and fusing at these points.

Another object of the invention is the provision of an improved blank for an electric heating device which may be readily completed either at the factory or at the point of installation to form a heating device having the desired characteristics to meet the installation or service requirements for a particular job.

Other objects include the provision of an improved heating element or heating element blank of the above indicated type which is simple and inexpensive to manufacture, install or use, which is safe and eliminates or minimizes danger from fire and under normal conditions of operation will give satisfactory service over a long period of time.

In the accompanying drawing—

Figure 1:
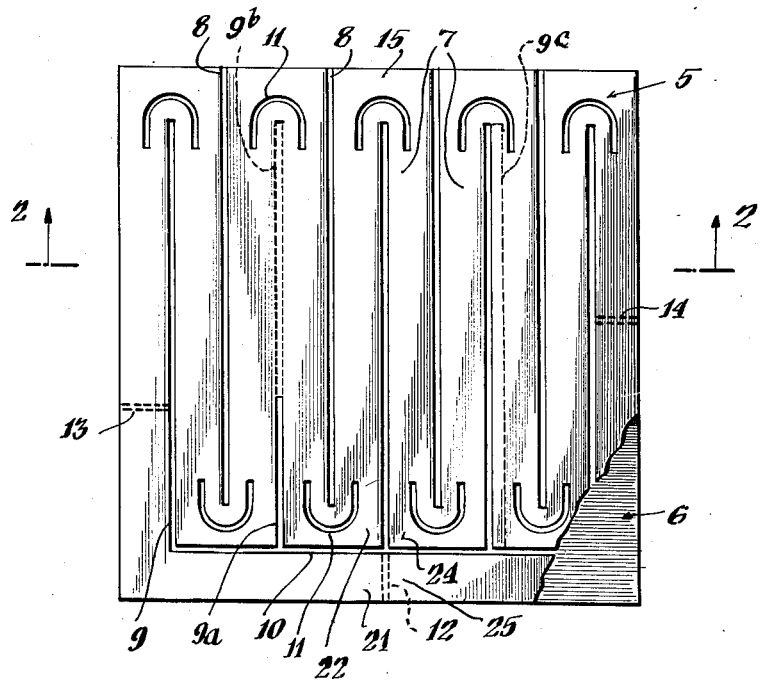
Figure 2:

Fig. 1 is a plan view of a heating device embodying our invention with a portion of the foil heating element broken away so as to reveal the backing sheet of insulating material; and Fig. 2 is a transverse sectional view on the line 2—2 of Fig. 1.

Our improved heating device is in the form of a panel consisting of a heating element 5 made of metallic foil and a backing sheet 6 made of suitable insulating material.

The foil may be made from any suitable metal or alloy which can be formed into foil and which can serve as an electric heating element as, for instance, lead, tin, zinc, aluminum and stainless steel. For this purpose we prefer to use a thin foil less than .002" in thickness made from lead or an alloy of lead with 1 to 4% antimony, or an alloy of lead having 1 to 4% tin or tin and antimony or a foil made of lead or the indicated lead alloy having a very thin coating of tin. Foil made from the preferred metal or alloys has a melting point which is high enough to make a practical heating element while at the same time it is low enough to provide the advantages of safety and automatic fusing if excessive temperatures are reached. Also a foil made from lead or the indicated alloys has a relatively high resistance so that the desired resistance and heat output can be obtained while, at the same time, using a relatively wide foil path.

The insulating backing sheet 6 may be applied to one or both surfaces and is made from suitable insulating material such as cellulose or asbestos paper, fabric, or woven or felted glass fibre. The illustrated backing sheet is in the form of a flexible sheet of woven glass fibre. However, under certain circumstances a rigid insulating panel such as a pressed wood or a molded panel or the like may be employed.

The foil is laminated to the insulating backing sheet by a suitable adhesive such as casein or silicone adhesives as may be required to withstand the operating temperatures and other conditions without adverse effect and which will not affect or interfere with the conducting or resistance characteristics of the unit.

A shown, the foil is cut by a series of slits into a continuous, endless current path 7 of appropriate width throughout its length. This may be accomplished by providing the foil sheet with a first set of slits 8 extending inwardly from one edge of the sheet and a second set of slits 9 in alternate relationship with the slits 8 and offset longitudinally with respect to the slits 8. There is one more slit 9 than there are slits 8 so that the outer slit at each side of the panel consists of one of the slits 9 with the result that the outer courses of the foil path connect with the remainder of the path at the top of the sheet as viewed in Fig. 1, forming a continuous foil path. A transverse slit 10 connects the lower end of the slits 9 so as to complete the endless foil path across the bottom of the panel.

The arrangement and disposition of the slits may be modified to meet the desired conditions. In the illustrated embodiment the foil sheet is of substantially rectangular shape and the slits 8 and 9 are substantially parallel to each other. Where the slits are of equal length and are equally spaced, a foil path of substantially uniform width throughout its length is obtained with the result that there is substantially uniform heat output throughout the unit. Variation in heat output in localized areas can be obtained by varying the spacing between the slits in such areas. In this connection, we have found that the heat output varies substantially inversely with the square of the width of the foil path. Also, control of resistance can be obtained by varying the length and also the width of the slits. Thus, one or more of the slits may initially be made of shorter length as shown at 9a or may be eliminated entirely and may thereafter be extended, as illustrated in dotted line at 9b to the desired length to meet the required conditions. Increasing the length of the slit increases the resistance at that point and results in an increase of local heat output but an over all decrease in heat output for the entire panel. Similarly, as shown at 9c, an additional line parallel to the line 9 may be cut in the foil or a section of the foil path may be cut away by increasing the width of one of the slits to thereby increase the resistance and local heat output at that point but to decrease the over all heat output for the panel. The position of the line 9c or the amount of the path which is cut away may be varied as desired to meet the required conditions.

It will be understood that the slits 8, 9 and 10 only extend through the sheet of foil and that the insulating backing remains intact thereby providing a self-contained and self-supporting heating panel.

The foil path extends around the lower ends of the slits 8 and around the upper ends of the slits 9 and there is a reversal in direction of current flow around these respective ends of the slits. We have found that there is a tendency for the current flow to concentrate around the ends of the slits at the point of reversal of direction of current flow and in heaters of relatively high output such local overheating may cause fusing at these points. In such cases, we may provide suitable means for distributing the current flow over a wider area and this means preferably takes the form of substantially U-shaped curved slits 11 formed around the free ends of the slits 8 and 9 and extending in overlapping relationship with the respective ends of the slits 8 and 9 into the adjacent courses of the current paths. In this connection, the ends of the slits 11 may be extended until they are joined together, thus establishing parallel current paths. In this way current traveling along the respective courses will be divided with a portion of the current flowing on both sides of the curved slits 11 and thereby obtaining a wider distribution of the current flow at the point of reversal of direction.

The heating device, as described, having a continuous endless current path, may be used as an electric heating device in that form or may be treated as a blank and may be completed in a simple manner to provide heating devices having various characteristics to meet different installation and service requirements. Thus, the foil current path may be severed at any point as indicated in dotted lines at 12, 13 or 14 depending upon the particular installation and operating conditions. If the current supply is available near the central portion of the lower part of the panel, the current path may be severed at the point 12 and the two leads connected to the path at opposite sides of the point of severance as indicated at 21 and 25. If the current supply is more readily available at another portion of the panel, the current path may be severed at another suitable point as, for instance, at the point 13 or at the point 14.

If desired, the unit may be used with the current path in continuous endless form and without severing the path at any point. Under those circumstances, one lead may be connected to one point, as, for instance, to the point 12 and the other lead may be connected at the opposite point in the current path, indicated by the numeral 15, at the top of the panel. The current will then flow through two parallel paths at the opposite sides of the center of the panel. In this case the current flowing around any single reverse point is only half the total current flowing through the heater. Therefore, heaters of relatively higher output may be constructed using two or more such parallel paths without danger of premature fusing at the reverse points. It will be seen that by varying the connections, with or without severing the current path, different electrical and heating characteristics can be obtained. Thus, leads can be connected to the panel at the most convenient points and a wide variety of ratings may be obtained. As an example, in the accompanying drawing we have indicated the connecting points 21, 22, 24 and 25. By making the electrical connections at different points or a different combination of points, different ratings and different heat output can be obtained. Thus, by connecting one side of the source of electric current at the point 21 and the other side to the point 25, the lowest rating will be obtained. By connecting one side of the source of electric current to the points 21 and 24 and the other side to the points 22 and 25, the highest rating will be obtained. It will be appreciated that various other combinations of connections could be made to provide variations in ratings between the two extremes.

As a general rule, prior to using the heating device an insulating covering similar to the backing 6 is applied over the exposed surface of the foil and is secured thereto in similar fashion. However, under certain circumstances the unit may be used in the indicated form without any covering.

From the foregoing, it will be seen that we have provided an improved metallic foil heating device and a blank for a heating device which is adjustable and flexible so that it can be used in its original form and so that it can be readily varied to meet different installation and service conditions. It will also be seen that where the heating unit is completed or varied that this operation may be performed either in the shop or at the point of installation. Due to the characteristics of the preferred foil heating element, our improved heating device provides for maximum safety since the foil path will fuse or melt prior to dangerous overheating.

It should be understood, of course, that modifications may be made in the illustrated and described embodiment of the invention without departing from the invention as set forth in the accompanying claims.

We claim:

1. A heating element blank comprising a panel formed of thin metallic foil laminated to a backing of insulating material, the foil being provided with two sets of slits arranged in alternate relationship and with the two sets of slits being offset longitudinally with respect to each other, one set of slits being arranged to extend to a first edge of the foil sheet at one end, the second set of slits being arranged as to be spaced from the edges at both ends and projecting beyond the first set of slits at the end opposite the first edge and a transverse slit disposed at right angles to the other slits and connected between the second set of slits at the end which projects beyond the first set of slits so as to form a continuous foil path.

2. An electric heating element comprising a panel formed of a sheet of thin metallic foil laminated to a backing of insulating material, the foil being provided with a first set of slits extending inwardly at one end from one edge of the sheet and being spaced from the opposite edge at the other end, a second set of slits arranged in alternate relationship to the first set of slits, said second set of slits being offset longitudinally with respect to the first set of slits so as to be spaced from both edges of the foil sheet and so as to project beyond the first set of slits at the end adjacent the second mentioned edge of the foil sheet and a transverse slit disposed substantially at right angles to the aforesaid slits and connected between the second set of slits adjacent the last mentioned end thereof so as to form a continuous current path.

3. An electric heating element as set forth in claim 2 in which additional slits are provided around the free ends of the slits for distributing the current flow over a relatively wide area at the ends of the slits.

4. An electric heating element comprising a thin foil sheet providing an electric current path and formed with a dividing slit having a terminal end dividing the current path into two adjacent courses connected integrally together beyond the terminal end of the dividing slit, the electric current flowing from course to course around the terminal end of the slit so as to cause substantially a 180° change in the direction of current flow, and current distributing slit means formed in the foil adjacent the terminal end of the dividing slit and spaced therefrom and extending into an adjacent course of the current path at a spaced distance from the dividing slit so as to distribute the current flow around the terminal end of the dividing slit and prevent undue current density at that point.

5. An electric heating element comprising a thin foil sheet providing an electric current path and formed with a dividing slit having a terminal end dividing the current path into two adjacent courses connected integrally together beyond the terminal end of the dividing slit, the electric current flowing from course to course around the terminal end of the slit so as to cause substantially a 180° change in the direction of current flow, and current distributing slit means formed in the foil adjacent the terminal end of the dividing slit and spaced therefrom and extending into the adjacent courses of the current path at a spaced distance from the dividing slit so as to distribute the current flow around the terminal end of the dividing slit and prevent undue current density at that point.

6. An electric heating element as set forth in claim 5 in which the current distributing slit means is a substantially U-shaped slit extending around the end of the dividing slit.

References Cited in the file of this patent

UNITED STATES PATENTS

| Number | Name | Date |
| --- | --- | --- |
| 636,203 | Helberger | Oct. 31, 1899 |
| 1,396,871 | Nagel | Nov. 15, 1921 |
| 2,495,788 | Trist | Jan. 31, 1950 |
| 2,553,762 | Gyuris | May 22, 1951 |
| 2,557,983 | Linder | June 26, 1951 |
| 2,597,674 | Robbins | May 20, 1952 |